Sept. 4, 1934.                E. F. KOHL                 1,972,741
                               CLUTCH
                         Filed May 4, 1932
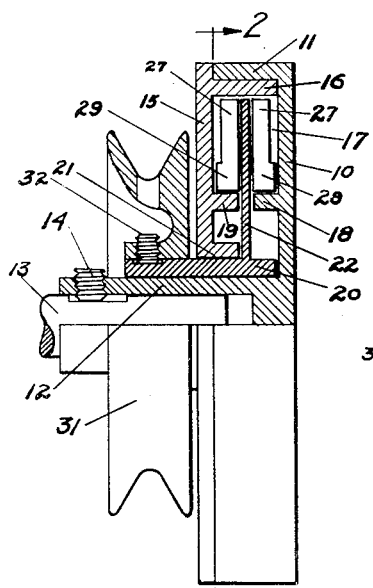
Fig. 1
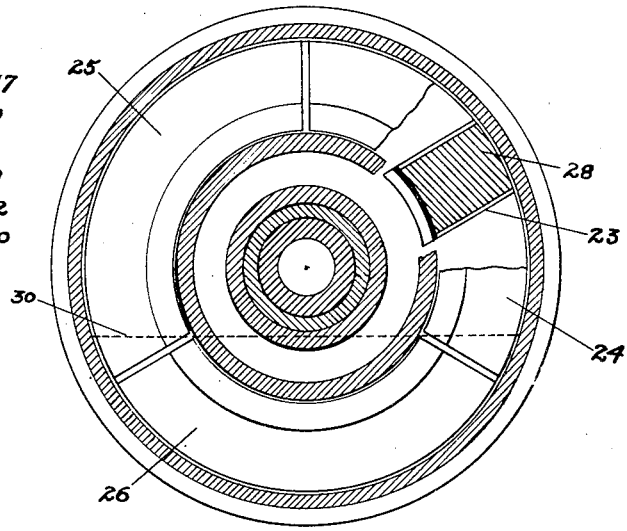
Fig. 2
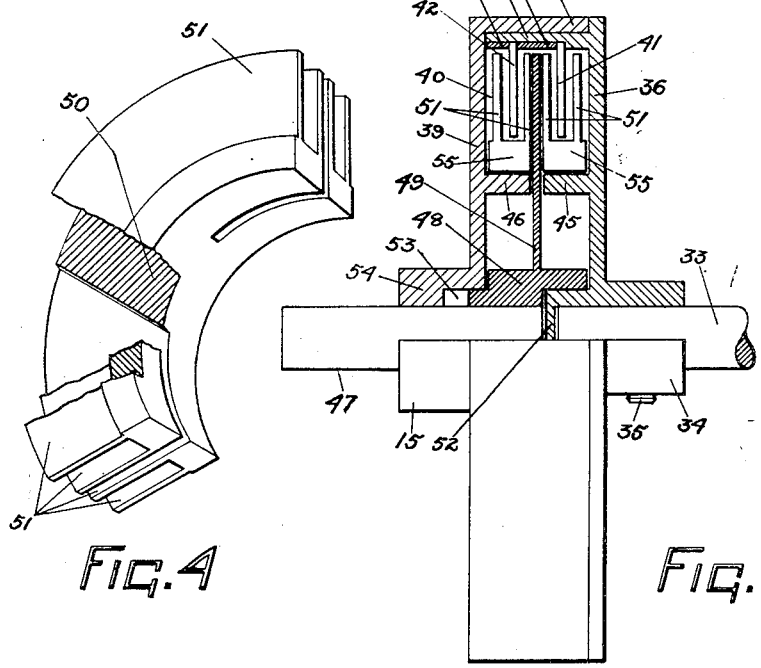
Fig. 4                                    Fig. 3
INVENTOR.
EVERARD FRANCIS KOHL
BY Kwis Hudson & Kent
ATTORNEYS Patented Sept. 4, 1934

1,972,741

UNITED STATES PATENT OFFICE 1,972,741

CLUTCH

Everard F. Kohl, Cleveland, Ohio

Application May 4, 1932, Serial No. 609,188

10 Claims. (Cl. 192—58)

This invention relates to clutches and, more particularly, to an automatic slip-type of clutch that is adapted to permit the driving member to come up to speed and gradually pick up the load.

There is a wide-spread demand for an automatic clutch for use in connection with electric motors or other prime movers which will allow the driving means to come to speed without load and also give protection to the driving means against overloads. The increasing use of the positive non-slip drive and the direct-coupled drive has brought with it the need for some auxiliary device which would permit the motor to come up to its rate of speed without shock or strain.

In many kinds of service, it is necessary for the driving mechanism to pick up a heavy load and bring it up to a predetermined speed of rotation. This automatically produces a heavy strain on the driving mechanism and necessitates the use of a larger and heavier mechanism than would otherwise be necessary.

It is therefore an object of this invention to provide a clutch that will enable an electric motor or other prime mover to come up to full speed, with practically no load, while at the same time, permitting a substantial time element for the driven member to come up to speed.

It is a further object of the invention to provide a clutch, of the type referred to, that will be extremely simple in construction, durable in use, and relatively inexpensive to manufacture.

It is a further object of the invention to provide a clutch of the type referred to that will be constant and always smooth in operation and have the minimum number of wearing parts and also so constructed that any wear that occurs will be automatically taken up.

Other objects of the invention and the features of novelty will be apparent from the following description, taken in conjunction with the accompanying drawing, of which Figure 1 is a composite view of one form of clutch embodying my invention, the lower part of the view being a side elevation and the upper part being a central longitudinal section;

Fig. 2 is a transverse section on the line 2—2 of Fig. 1, with certain parts broken away;

Fig. 3 is a view similar to Fig. 1, but showing another type of construction embodying my invention;

Fig. 4 is a perspective view of one of the elements of the construction illustrated in Fig. 3, with certain parts broken away and other parts shown in section.

Referring to Figs. 1 and 2 of the drawing, the driving member of the clutch comprises the disk-like part 10 having an axially extending peripheral flange 11 and a hub 12 in which the driving shaft 13 is secured by a set screw 14, or in any suitable manner. Associated with the part 10, in forming the driving member, is the disk-like part 15 having an axially extending peripheral flange 16 which is telescoped with the flange 11 to provide, in the driving member, a peripherally closed chamber 17. The parts 10 and 15 are provided on their inner surfaces with flanges 18 and 19, respectively, these flanges being opposite each other and concentric to the axis of rotation of the clutch. The outer surfaces of the flanges 18 and 19 constitute friction or clutch surfaces for a purpose to be hereinafter described.

The driven member of the clutch comprises a hub 20 that is rotatably mounted on the hub 12 and projects through the central opening 21 in the part 15. A disk 22 which may be integral with the hub 20 or attached thereto in any other suitable manner, projects between the flanges 18 and 19 and on into the chamber 17, as shown in Fig. 1. This disk 22 has a plurality of radial slots 23, of which there are three in the construction illustrated, although there may be two or more than three of such slots.

The arcuate members 24, 25 and 26, each have fin-like portions 27 arranged on opposite sides of the disk 22, and a central connecting web or portion 28 which is slidably arranged in the slot 23 so that the members 24, 25 and 26 are thereby caused to rotate with the disk 22, although slidable radially in the slots 23. The members 24, 25 and 26 have shoe-like inner portions 29, the inner surfaces of which conform to and are adapted to engage with the outer or clutch surfaces of the flanges 18 and 19.

A body of suitable liquid, preferably mercury because of its relatively high specific gravity and pactically stable nature under ordinary conditions, is placed in the chamber 17. A sufficient quantity of mercury is used to fill the chamber substantially to the level of the line 30.

For convenience in illustrating the construction, I have somewhat exaggerated the width of the spaces between the disk 22, the fins 27 and the inner side walls of the parts 10 and 15 but, in practice, these spaces will preferably be about $\frac{1}{32}$ of an inch wide although satisfactory results can be obtained with wider spaces.

In the operation of the clutch illustrated in Figs. 1 and 2, it may be assumed that the shaft 13 represents the armature shaft of a motor, and when this shaft is not rotating the mercury will stand in the lower part of the chamber 17. When the motor is started the driving member of the clutch, being secured to the shaft 13, will come up to speed with the latter. Assuming that there is a driven load connected with the pulley 31, which is mounted on the hub 20 and secured thereto by a set screw 32, or otherwise, the driven member of the clutch will stand still while the motor is coming up to speed and since the driving and driven members are freely rotatable with respect to each other, except for the slight friction in the bearings, there will be practically no load on the motor during the starting period. However, as the driving member of the clutch comes up to speed, the drag on the mercury will cause the latter to be gradually picked up by the driving member and, as the speed increases, the mercury will eventually assume the form of an annulus in the peripheral portion of the chamber 17 and the centrifugal forces acting on the mercury when it is thus rotating with the driving member, will so press the mercury against the surfaces that it contacts with, and particularly the surfaces of the disk 22 and the fins 27, that a drag will be exerted on these surfaces which will cause the driven member to start to rotate and gradually come up to the speed of the driving member. The buoyancy of the mercury on the members 24, 25 and 26, as well as the pressure in the mercury due to the centrifugal force acting thereon, which acts radially inward on the peripheries of the members 24, 25 and 26, will force these members inwardly so that they will engage with the friction or clutch surface on the flanges 18 and 19 and, when the driven member is up to the speed of the driving member, the driving and driven members will be thus frictionally locked together. In the case of an overload on the driven member the latter may slow down or stop altogether and the driving member will continue to rotate without the generation of an excessive amount of heat and without overloading the motor or prime mover.

Since the movement of the members 24, 25 and 26 radially inward against the flanges 18 and 19 results from the buoyancy of the mercury and the pressure in the mercury due to centrifugal force, it will be apparent that the speed at which the driving and driven members become frictionally locked together will vary with the amount of mercury in the device and will also be affected by the specific gravity of the material from which the members 24, 25 and 26 are made and the peripheral area of these members that is subjected to the radially inward pressure by the mercury. The amount of mercury in the device determines the extent to which the peripheral portions of the members 24, 25 and 26 are submerged and, therefore, the buoyant force on these members, and the pressure in the mercury, due to centrifugal force, will be dependent on the radial depth of the annulus which the mercury takes the form of as it comes up to the speed of the driving member.

Since the motor or prime mover starts under practically no load and picks up the driven member after coming up to speed, it is possible to use smaller motors than is now customary in cases where the motor has to start overloaded, as in a washing machine or a refrigerating machine.

While in the operation of the clutch I prefer to utilize the member 10 as the driving element and the member 20 as the driven element because the maximum efficiency of operation is obtained under this arrangement, it is also possible to reverse the arrangement and use the member 20 as the driving element of the clutch.

In operating the clutch I have discovered that after the members 24, 25 and 26 engage with the clutch surfaces of the flanges 18 and 19, these parts will remain in engagement on decreasing speed, until the speed is reduced considerably below that at which the engagement occurred and this is of especial advantage in enabling the clutch to handle overloads of short duration.

In the form of the invention illustrated in Figs. 3 and 4, the driving shaft is indicated at 33 and extends into the hub 34 of the driving member and is secured therein by a set screw or other means 35. The hub 34 is preferably integral with the disk-like part 36, having an axially extending peripheral flange 37 which telescopes with the flange 38 on the part 39 which, with the part 36, forms the hollow driving member having an annular chamber 40 therein. The flange 37 is counterbored and, in this counterbore, the annular disks 41 and 42 are seated. Each of these disks comprises two semi-circular parts and the disks are spaced apart by a ring 43. A ring 44 holds the disk 42 in place. The parts 36 and 39 are provided with the internal axially extending flanges 45 and 46, respectively, the outer surfaces of which constitute brake surfaces.

The driven shaft is indicated at 47 and carries a hub 48 on which there is a disk 49 that projects outwardly between the flanges 45 and 46 to a point adjacent the ring 43. The disk 49 is provided with a plurality of radial slots similar to the radial slots 23, previously described, and carries a plurality of arcuate members such as illustrated in Fig. 4. Each of these arcuate members has a central part 50 which is arranged in one of the radial slots, in the disk 49, and on opposite sides of the disk 49 each of these arcuate members has a plurality of fins 51 between which the annular disks 41 and 42 are arranged, as shown in Fig. 3. The spaces between the fins and the disk are somewhat exaggerated in width, in Fig. 3, and in practice these spaces will preferably be about $\tfrac{1}{32}$ of an inch wide.

As in the construction illustrated in Figs. 1 and 2, there is a body of liquid, preferably mercury, in the chamber 40 and to prevent the escape of this liquid the central portion of the part 36 is closed by the wall 52 at the inner end of the hub 34. A packing ring 53, of felt or other suitable material, is arranged in the recess 54 in the hub 55, on the part 39, so that leakage of the liquid along the shaft 44 is prevented.

The operation of this form of the invention will be understood from the foregoing description of the operation of the form shown in Figs. 1 and 2, the principal difference between the two constructions being that the construction illustrated in Figs. 3 and 4 has a larger area with which the mercury contacts so that this form of clutch is capable of transmitting a larger torque.

The arcuate members, above referred to, are provided with the shoes 55 for cooperation with the friction or clutch surfaces on the flanges 45 and 46 so as to lock the driving and driven members together.

While I have illustrated and described what I now consider to be the preferred embodiments of my invention, it is to be understood that various changes in the details of construction and arrangement of the parts may be made without departing from the spirit of the invention as defined in the appended claims.

Having thus described my invention, I claim:

1. A clutch comprising a hollow rotatable driving member having a clutch surface on its interior, a driven member arranged in said driving member, a plurality of members operatively connected with said driven member so as to rotate therewith but movable radially into and out of engagement with said clutch surface, and a body of liquid in said driving member for transmitting power from the driving member to the driven member and in which the peripheral portions of said plurality of members are submerged and whereby said plurality of members are moved inwardly against said clutch surface.

2. A clutch comprising a hollow rotatable driving member having a clutch surface on its interior, a driven member arranged in said driving member and provided with radial slots, a plurality of arcuate members each having portions on opposite sides of said driven member and a central portion arranged in one of said slots so as to be rotatable with said driven member but movable radially thereof, said arcuate members having surfaces adapted to engage said clutch surface, and a body of liquid in said driving member for transmitting power from said driving member to said driven member and in which the peripheral portions of said plurality of members are submerged and whereby said arcuate members are moved into engagement with said clutch surface.

3. A clutch comprising a driving member which consists of a plurality of telescoping parts so assembled as to form an annular chamber, a plurality of axially spaced annular disks carried by said member in said chamber, said driving member having an internally arranged clutch surface, a driven member having a disk in said chamber and spaced from the walls thereof and provided with radially extending guiding means, a plurality of arcuate members having portions arranged in the spaces between said annular disks and portions slidably fitting said guiding means, said arcuate members also having surfaces adapted to cooperate with said clutch surface, and a body of mercury arranged in said chamber and through which power is transmitted from the driving to the driven member.

4. A clutch comprising a driving member formed of a plurality of disk-like parts having their peripheral portions secured together to form an annular chamber, said parts each having outwardly facing clutch surfaces in said chamber, one of said parts having a closed center and the other of said parts having a central opening through which a driven shaft projects, said driven shaft having a disk arranged in said chamber and provided with radially extending guiding means, a plurality of arcuate members each having a plurality of outwardly projecting axially spaced fins, a central portion slidably fitting said guiding means and an inner shoe portion adapted to engage said clutch surface, and a body of mercury in said chamber through which power is transmitted from said driving member to said driven member.

5. A clutch comprising a driving member formed of a plurality of disk-like parts having their peripheral portions secured together to form an annular chamber, said parts each having a flange in said chamber and said flanges having outwardly facing clutch surfaces, one of said parts having a closed center and the other of said parts having a central opening through which a driven shaft projects, said driven shaft having a radially slotted disk arranged in said chamber, a plurality of arcuate members each having a plurality of outwardly projecting axially spaced fins, a central portion slidably fitting one of said slots and an inner shoe portion adapted to engage said clutch surfaces, said driving member having fixed on the interior thereof and alternately spaced between said fins a plurality of annular disks, and a body of mercury in said chamber through which power is transmitted from said driving member to said driven member.

6. A clutch comprising a hollow driving member having a clutch surface therein, a driven member having radially movable elements positioned thereon radially outward of said surface and provided with surfaces adapted to engage said clutch surface to lock said driving and driven members together, and a body of liquid in said driving member cooperating with the outer peripheral portions of said elements to move the latter inwardly into engagement with said clutch surface.

7. A clutch comprising a hollow rotatable member, a member coaxial with the first mentioned member and projecting into the latter, one of said members being the driving member and the other the driven member of the clutch, a plurality of elements operatively connected with one of said members to rotate therewith but movable radially thereof, a clutch surface on the other of said members positioned radially inward of said elements and into engagement with which said elements are movable, and a body of liquid in said first mentioned member for transmitting power from the driving member to the driven member and in which said elements are partially submerged and whereby said elements are moved into engagement with said clutch surface.

8. A clutch comprising a hollow rotatable driving member having a body of liquid therein, a rotatable driven member coaxial with the driving member and having a portion thereof submerged in said liquid, and elements rotatable with one of said members and adapted to float in said liquid and movable radially into and out of engagement with the other of said members in accordance with the changes in the pressure in said liquid due to changes in the speed of rotation.

9. A clutch comprising a hollow rotatable driving member having a body of liquid therein, a rotatable driven member coaxial with the driving member and having a portion thereof submerged in said liquid, and elements rotatable with said driven member and adapted to float in said liquid and movable radially into and out of engagement with the driving member in accordance with the changes in pressure in said liquid due to changes in the speed of rotation.

10. A clutch comprising a hollow rotatable member having a body of liquid therein, a rotatable member coaxial with the first mentioned member and having a portion thereof submerged in said liquid, and elements rotatable with one of said members and adapted to float in said liquid and movable radially into and out of engagement with the other of said members in accordance with the changes in pressure in said liquid due to changes in the speed of rotation.

EVERARD F. KOHL.